United States Patent [19]

Goodman et al.

[11] 4,099,236
[45] Jul. 4, 1978

[54] SLAVE MICROPROCESSOR FOR OPERATION WITH A MASTER MICROPROCESSOR AND A DIRECT MEMORY ACCESS CONTROLLER

[75] Inventors: William R. Goodman, Sunnyvale; Stephen P. Sample, Los Altos; Allan L. Goodman, San Jose, all of Calif.

[73] Assignee: Intel Corporation, Santa Clara, Calif.

[21] Appl. No.: 798,849

[22] Filed: May 20, 1977

[51] Int. Cl.² .................. G06F 15/16; G06F 13/00
[52] U.S. Cl. ............................................. 364/200
[58] Field of Search ... 364/200 MS File, 900 MS File

[56] References Cited

U.S. PATENT DOCUMENTS

| | | |
|---|---|---|
| 3,510,844 | 5/1970 | Aranyi ........................ 364/200 |
| 3,766,526 | 10/1973 | Buchanan ..................... 364/200 |
| 3,909,799 | 4/1975 | Recks ........................... 364/200 |
| 4,006,466 | 2/1977 | Patterson ...................... 364/200 |

Primary Examiner—James D. Thomas
Attorney, Agent, or Firm—Blakely, Sokoloff, Taylor & Zafman

[57] ABSTRACT

An integrated circuit, slave microprocessor with its bus protocol is described. The slave unit may be activated by either a master microprocessor or a DMA controller. When activated by the DMA controller, handshaking signals between the controller and slave microprocessor permit the transfer of data between these units without intervention by the master microprocessor. Unique flags permit the master processor to readily determine the status of the slave microprocessor.

10 Claims, 3 Drawing Figures a master microprocessor. Typically, the slave unit is programmed for specialized computations or tasks, thereby relieving the master microprocessor of these tasks and providing the master processor with a greater degree of freedom.

SLAVE MICROPROCESSOR FOR OPERATION WITH A MASTER MICROPROCESSOR AND A DIRECT MEMORY ACCESS CONTROLLER

BACKGROUND OF THE INVENTION:

1. Field of the Invention

The invention relates to the field of interfacing digital computers, particularly microcomputers or microprocessors and to the field of microprocessors suitable for operation as slave units.

2. Prior Art

In computer applications and particularly with microcomputers and microprocessors, it is sometimes advantageous to employ a second microprocessor as a slave unit to a master microprocessor. Typically, the slave unit is programmed for specialized computations or tasks, thereby relieving the master microprocessor of these tasks and providing the master processor with a greater degree of freedom.

Since the slave unit for practical reasons, must be coupled to the common data bus shared by the master microprocessor, random-access memory (RAM) and other units such as a direct memory access (DMA) controller, the master-slave microprocessor protocol is an important consideration if effective utilization of the slave processor is to be achieved. Some of the advantages of the slave unit are lost if continuous intervention by the master microprocessor is required for all the activities of the slave unit.

With the described slave microprocessor and its protocol with the master microprocessor, the slave unit is readily controlled by the master unit, however, data transfer under the control of the DMA controller is possible without intervention by the master microprocessor.

SUMMARY OF THE INVENTION

A slave microprocessor for coupling with a bidirectional data bus which, in turn, is coupled to a master microprocessor is described. The slave microprocessor includes a first data register coupled to this bus for receiving signals from the bus and a second data register for coupling signals to this bus from the slave microprocessor. A third (status) register is coupled to the bus for providing status signals to the master microprocessor. The control means for the slave microprocessor receives a read signal, write signal, select signal, and one additional signal from the master microprocessor. This control means, in turn, provides a first signal to the status register to indicate that the first data register has received data from the bidirectional data bus or a second signal to the status register to indicate that the second data register contains data for transfer to this bus. The additional signal from the master microprocessor is employed by the control means of the slave microprocessor for coupling either the first data register or the status register to the bidirectional data bus when a read signal is received from the master microprocessor. This additional signal, however, is coupled into the status register, and hence may be sensed by the master microprocessor, when the microprocessor receives a read signal. In this manner, the status of the slave microprocessor may be readily determined by the master microprocessor.

DETAILED DESCRIPTION OF THE INVENTION

A slave microprocessor adaptable for coupling to a bidirectional data bus which is controlled by a master microprocessor is described. In the presently preferred embodiment, a direct memory access (DMA) controller is also coupled to the bus along with a random-access memory (RAM). In the following description, well-known circuits have been shown in block diagram form in order not to obscure the disclosed inventive concepts in unnecessary details. In other instances, specific details such as the specific number of bits, etc., have been described in order to provide a thorough understanding of these inventive concepts. It will be obvious to one skilled in the art that these inventive concepts may be practiced without employing the specific details.

Figure 1:
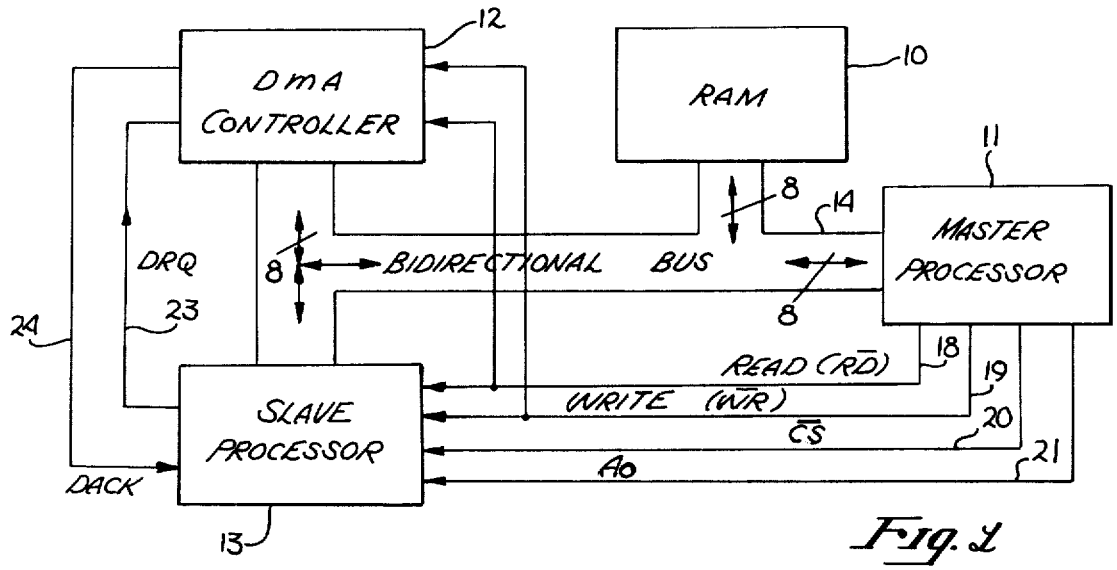
FIG. 1 is an overall block diagram which illustrates the slave microprocessor and its coupling with the master microprocessor, a RAM and a DMA controller.

Referring now to FIG. 1, the slave microprocessor 13 of the present invention is shown coupled to an eight line bidirectional bus 14. This bus interconnects the slave processor 13 with a master microprocessor 11 and with a RAM 10 and DMA controller 12. The master microprocessor 11 may be any one of a plurality of commercially available microprocessors such as the 8080, 8048, 8748, or M6800. The RAM 10 may be any one of a plurality of well-known dynamic or static memories often employed with microprocessors. Any one of several DMA controllers which are commercially available may be employed for the controller 12. While not shown in FIG. 1, the bidirectional data bus may be coupled to other units such as a program storage memory, other controllers, etc. Moreover, numerous "chips" required or operation of the computer system of FIG. 1, all of which are well-known, have not been shown such as clock generators, power supplies, etc. In the presently preferred embodiment, the master processor 11, RAM 10, DMA controller 12, and the slave processor 13 are each disposed on a single silicon substrate and interconnected through the lines 14, which lines are defined as part of a printed circuit board.

The slave microprocessor 13, in the presently preferred embodiment, is fabricated on a silicon substrate and employs n-channel, field-effect devices having polycrystalline silicon gates. The processor 13 includes a read-only memory (ROM) for storing the processor's program. This memory is stored in one embodiment in a mask programmable memory and in another embodiment in a programmable read only memory. The processor also includes an arithmetic logic unit, program counter, instruction decoder, and a random-access memory employed both for scratchpad storage and for storage of the contents of the program counter. The general circuitry of the slave microprocessor when employed in a microcomputer is described in *Digest of*

*Technical Papers*, IEEE, ISSCC, 1977, in an article by Stam, Budde, Blume and Morgan; *Electronics* "Single Chip 8 Bit Microcomputer Fills Gap Between Calculator Types and Powerful Multichip Processors," Nov. 25, 1976; and Intel's User's Manual for the MCS-48. Those aspects of this microcomputer which make it suitable for operation as a slave microprocessor and the bus protocol are described herein.

Figure 2:
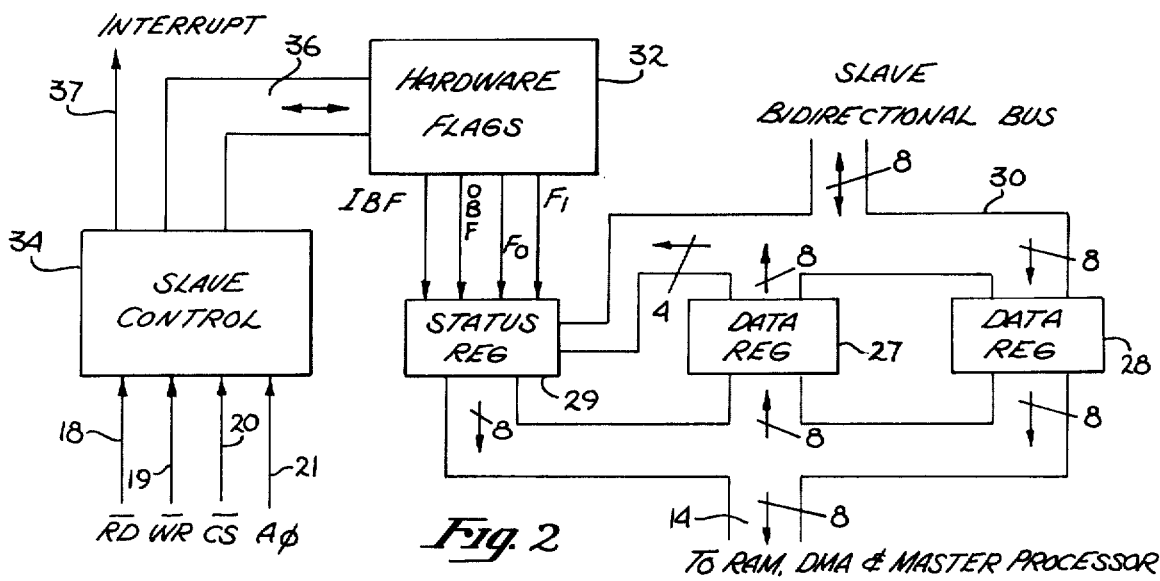
FIG. 2 is a block diagram of a portion of the slave microprocessor and mainly illustrates the three registers coupled to the bidirectional data bus and a portion of the control means for the slave microprocessor.
Figure 3:
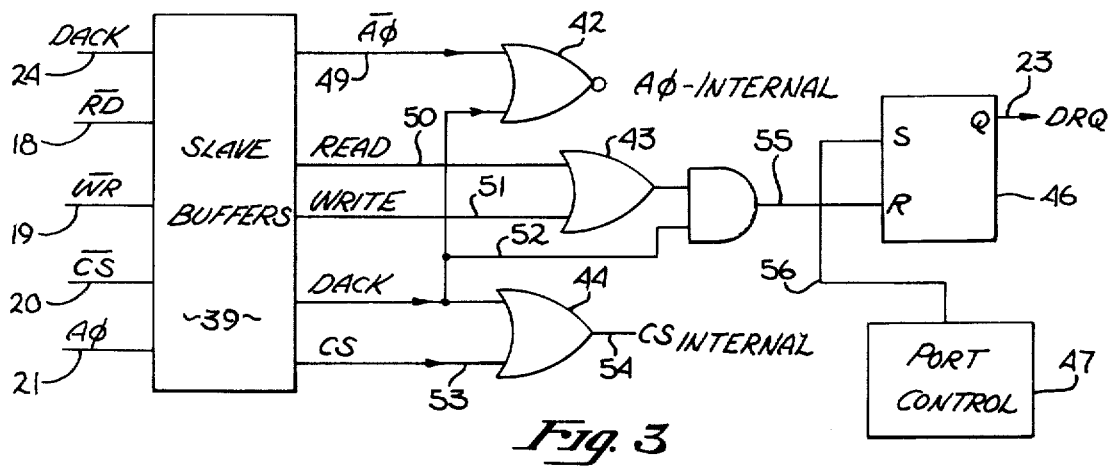
FIG. 3 is a block diagram of a portion of the control means for the slave microprocessor and primarily illustrates the logic associated with the handshaking signals between the slave microprocessor and the DMA controller.

The master microprocessor 11 couples four control signals to the slave microprocessor 13 on lines 18 through 21. These signals include a read signal ($\overline{RD}$) which indicate that the master microprocessor will read information from processor 13 and a write signal ($\overline{WR}$) on line 19 which indicates that a master microprocessor 11 will write information into the processor 13, that is, the processor 13 should read information from the bidirectional bus. A chip select signal ($\overline{CS}$) is coupled to the processor 13 on line 20; another signal designated as $A_\phi$, the purpose of which will be described in more details in conjunction with FIGS. 2 and 3 is also coupled to processor 13 on line 21. The read and write signals on lines 18 and 19, respectively, are also coupled to the DMA controller 12.

Separate control lines which provide handshaking signals between the controller 12 and processor 13 are coupled between these means on lines 23 and 24. Specifically, a DRQ (data request) signal is coupled from the processor 13 to the controller 12 on line 23 and a DACK (DMA acknowledge) signal is provided by controller 12 to the processor 13 on line 24.

Referring now to FIG. 2, the bidirectional data bus 14 is coupled to an eight-bit data register 27 which receives data from the bus 14. The slave microprocessor couples data to the bus 14 through the data register 28. This eight-bit register along with the data register 27 are coupled to the internal bidirectional bus 30 of the slave microprocessor. The internal microprocessor bus 30 is also coupled to a status register 29 and provides four general purpose status flags to the bidirectional bus 14 in addition to the four flags from the hardware flag means 32.

The control signals for the slave processor, namely $\overline{RD}$, $\overline{WR}$, $\overline{CS}$, and $A_\phi$ are coupled by lines 18 through 21 to the control means 34 of the slave processor. This means in addition to generating an interrupt circuit on line 37 provides control signals for the microprocessor and also for the generation of flags which are generated within the flag generation means 32. The slave control means 34 is coupled to the flag generation means 32 via lines 36. The generation of some of the control signals for the slave microprocessor will be described in conjunction with FIG. 3.

The hardware flag means 32 provides four signals to the status register 29. The first of these signals identified as IBF (Input Buffer Filled) is used to indicate that data register 27 is filled. The OBF signal (Output Buffer Filled) is used to indicate that the data register 28 is filled. The $F_0$ and $F_1$ are general purpose flags which may be tested by software, toggled, cleared and may be used to convey information to the master microprocessor 11 such as to indicate "lockout" or other conditions.

Assume first that the master mircoprocessor 11 is to read information from the data register 28. The processor 11 provides a true signal on line 18, a false signal on line 19, a true signal on line 20, and a low signal on line 21. With these signals the slave microprocessor enables data register 28 onto bus 14 then clears the OBF flag. If on the other hand the master microprocessor 11 is to read the status register 29, the $A_0$ bit is set high with $\overline{RD}$ true, $\overline{WR}$ false and $\overline{CS}$ true. Thus, when the master microprocessor 11 reads data from either registers 28 or 29, the $A_0$ signal, line 21, is used to select one of these two registers.

The $A_0$ signal, line 21, serves a different purpose, however, during the writing of data by the master microprocessor 11 into the data register 27. During this mode of operation $\overline{RD}$ is false, $\overline{WR}$ true, and $\overline{CS}$ is true. For these conditions the signal on $A_0$ is loaded from the slave control means 34, lines 36 into the status register as the $F_1$ flag. Then the IBF flag is set and data is loaded into the data register 27 from the bus 14. Also, an interrupt is generated on line 37. The signal on line 21 which is loaded into the status register 29 may serve any one of a plurality of purposes. For example, it may be used to indicate whether a command or data was loaded into the register 27. Thus the $A_\phi$ signal is used for different purposes during the reading and writing of information into the slave microprocessor.

Referring now to FIG. 3 the slave microprocessor includes a plurality of buffers 39. These buffers receive the signals on lines 18 through 21 and also the DACK signal on line 24. The output of these buffers provide a read signal on line 50 (complement of $\overline{RD}$), a write signal on line 51 (complement of $\overline{WR}$), a DACK signal on line 52, a CS signal on line 53 (complement of $\overline{CS}$), and a $\overline{A_\phi}$ line 49 (complement of $A_\phi$). The $\overline{A_\phi}$ signal is coupled to one input terminal of the NOR gate 42. The other input terminal of this NOR gate receives the DACK signal, line 52. The output of this gate provides an $A_\phi$-internal signal for use by the slave microprocessor. The read and write signals, lines 50 and 51, respectively, are coupled to input terminals of an OR gate 43. The output of OR gate 43 is coupled to one input terminal of an AND gate 55. The other input terminal to this AND gate is coupled to receive the DACK signal. The output of AND gate 55 is coupled to the reset terminal of a bistable circuit (flip-flop) 46. The set terminal of the bistable circuit 46 is coupled to a port control means 47 via a line 56. Line 56 receives a signal under software control when a read of register 28 of a write to register 27 is desired. The DACK signal is also coupled to one input terminal of an OR gate 44. The CS signal is coupled to the other input terminal of this gate. The output of this OR gate, line 54, provides an internal chip select signal for the slave microprocessor.

The circuit of FIG. 3 illustrates the generation of the handshaking signals employed between the DMA controller 12 of FIG. 1 and the slave processor 13. Data may be transferred between the processor 13 under control of the controller 12, for example, to the RAM 10 without intervention by the master processor 11. When the DMA controller 12 controls the data transfer it provides the DACK signal on line 24. Since this signal is coupled to one input terminal of the OR gate 44, the output of this gate provides the internal chip select signal. This signal becomes positive when either the DACK signal is transmitted to the processor 13 or when the CS signal from the master microprocessor 11 becomes true. Thus insofar as the slave processor is concerned it sees no distinction when selected either by the controller 12 or the processor 11. The DACK signal also assures that the $A_{100}$ internal signal remains low when the DACK signal is present since this signal is coupled to one input terminal of the NOR gate 42. This assures that during the reading of data from the slave processor only data register 28 is enabled.

When either the read signal or write signals are true an output signal is present at OR gate 43. When this signal is present along with the DACK signal, the flip-flop 46 is reset such that the DRQ signal on line 23 becomes low. In this manner, the controller is informed that processor 13 has received or returned data and is not in a condition to receive or return additional data. When the slave processor is ready to request another data transfer, a signal is generated on line 56 which sets the bistable circuit 46 such that a signal is provided on line 23. This signal indicates that data is requested by the processor 13. Thus for each byte of data which is transferred to or from the processor 13, the DACK and DRQ signals alternately change state. These handshaking signals allow the slave microprocessor to control the flow of large amounts of information between the RAM 10 and the slave processor 13 without intervention by the master processor 11.

Thus, a slave microprocessor has been described which is readily controlled by a master processor with a minimum of control signals and wherein the status of the slave microprocessor may be readily ascertained by the master processor. In one mode of operation the slave processor is controlled by a DMA controller thereby permitting the transfer of inforamation, by way of example, from a RAM to the slave processor without intervention by the master processor.

We claim:

1. A slave microprocessor for operating on a bidirectional data bus which bus is coupled to a master microprocessor comprising:
    a first data register adapted to be coupled to said bus to receive signals from said bus;
    a second data register adapted to be coupled to said bus to provide signals from said slave microprocessor to said bus;
    a third register adapted to be coupled to said bus to provide signals representative of the status of said slave microprocessor to said bus;
    control means coupled to said first, second and third registers for controlling said slave microprocessor, said control means adapted to receive a read signal, a write signal, a select signal and at least one additional signal from said master microprocessor, said control means for providing a first signal to said third register which indicates that said first data register contains data and for providing a second signal to said third register to indicate that said second data register contains data, said control means adapted to couple one of said first or third registers to said bus when said slave microprocessor receives said read signal based on the state of said additional signal, and for coupling said additional signal into said third register when said microprocessor receives a write signal;
    whereby the status of said slave microprocessor may be determined by said master microprocessor.

2. The microprocessor defined by claim 1 wherein said first, second and third registers are each 8 bit registers.

3. The microprocessor defined by claim 2 wherein said third register is coupled to receive 4 bits of information from a slave bus, said slave bus coupled to said first and second data registers.

4. The microprocessor defined by claim 1 wherein said control means is adaptable to receive a second select signal and generates an internal select signal for said slave microprocessor when either said first or second select signals are true.

5. The microprocessor defined by claim 4 including a terminal coupled to said control means for cooperatively coupling said slave microprocessor to a direct memory access controller.

6. A slave microprocessor for operating on a bidirectional data bus which is coupled to a master microprocessor and to a direct memory access controller comprising:
    a first data register adapted to be coupled to said bus to receive signals from said bus;
    a second data register adapted to be coupled to said bus to provide signals from said slave microprocessor to said bus;
    a third register adapted to be coupled to said bus to provide signals to said bus representative of the status of said slave microprocessor;
    a first circuit means for providing a signal for said slave microprocessor to indicate that said slave microprocessor has been selected to communicate with said bus, said circuit adapted to be activated by signals from either said master microprocessor or said controller, said first circuit means adapted to be coupled to said master microprocessor and said controller;
    second circuit means adapted to be coupled to said controller to provide a signal to said controller indicating that data has been transferred from one of said first or second registers, said second circuit means coupled to said first and second registers;
    third circuit means coupled to said third register and adapted to be coupled to said master microprocessor for providing signals to said third register to indicate that data has been transferred into one of said first or second registers;
    whereby data may be transferred into and from said slave microprocessor under control by said master microprocessor or under control of said direct memory access controller.

7. The microprocessor defined by claim 6 wherein said third circuit means is adapted to receive a read signal, write signal, select signal and at least one additional signal from said master microprocessor, and wherein said signals provided by said third circuit means comprise a first signal to said third register to indicate that said first data register has received data from said bus and a second signal to said third register to indicate that said second data register contains data for said bus.

8. The microprocessor defined by claim 7 wherein said third circuit means also is adapted to couple one of said first or second registers to said bus when said slave microprocessor receives said read signal based on the state of said additional signal, and couples said additional signal into said third register when said microprocessor receives a write signal.

9. The microprocessor defined by claim 8 wherein said first, second and third registers are each 8 bit registers.

10. The microprocessor defined by claim 9 wherein said third register is coupled to receive 4 bits of information from a slave bus, said slave bus also coupled to said first and second data registers.

* * * * *